US007656836B2

(12) United States Patent
Baker et al.

(10) Patent No.: US 7,656,836 B2
(45) Date of Patent: Feb. 2, 2010

(54) CENTRALIZED CONTROLLER FOR DISTRIBUTED HANDLING OF TELECOMMUNICATIONS FEATURES

(75) Inventors: Albert J. Baker, Eatontown, NJ (US); John Joseph Sangermano, Red Bank, NJ (US); Hal B. Zenner, Fair Haven, NJ (US)

(73) Assignee: Avaya Inc., Basking Ridge, NJ (US)

( * ) Notice: Subject to any disclaimer, the term of this patent is extended or adjusted under 35 U.S.C. 154(b) by 685 days.

(21) Appl. No.: 11/539,162

(22) Filed: Oct. 5, 2006

(65) Prior Publication Data

US 2008/0084840 A1 Apr. 10, 2008

(51) Int. Cl.
*H04W 4/00* (2006.01)

(52) U.S. Cl. ....................... 370/328; 370/352; 370/400; 455/517; 709/217

(58) Field of Classification Search ....................... None
See application file for complete search history.

(56) References Cited

U.S. PATENT DOCUMENTS 6,985,961 B1 1/2006 Ramsayer et al.
7,170,863 B1 * 1/2007 Denman et al. ............. 370/260
2005/0021976 A1 1/2005 Trossen
2006/0168319 A1 7/2006 Trossen
2007/0237139 A1 * 10/2007 Garcia-Martin et al. ..... 370/389
2008/0247381 A1 * 10/2008 Bohm et al. ................ 370/352

FOREIGN PATENT DOCUMENTS

EP 1643713 A1 4/2006

OTHER PUBLICATIONS

M.I. Lopez, "International Search Report and Written Opinion", Mar. 3, 2008, Publisher: EPO, Published in: EP.

* cited by examiner

*Primary Examiner*—Bob A Phunkulh
(74) *Attorney, Agent, or Firm*—DeMont & Breyer, LLC

(57) ABSTRACT

A method is disclosed that enables an improvement in the scalability of a centralized server by reallocating to the client endpoints some, but not all, of the feature functionality of the server. Each logical user in the system is represented by his own private domain of endpoint entities, from which an endpoint is selected to serve as a super peer to represent the user to the centralized server. Furthermore, a designated endpoint is selected, also from the private domain of devices, to handle some of the telecommunications features that the server otherwise would have handled. Each endpoint in the private domain is permitted to have limited direct access to the server, typically for the purposes of registering and subscribing to features, in addition to and in contrast with the indirect access through the super peer. During the subscribing process, the server redirects a subscribing endpoint to the designated endpoint that is handling the feature.

24 Claims, 9 Drawing Sheets

520
200
202-1
511
202-2
214
513
512
515
517
516
202-3
202-4
202-5
Telecommunications Network
201
Server
203-1
Server
203-N

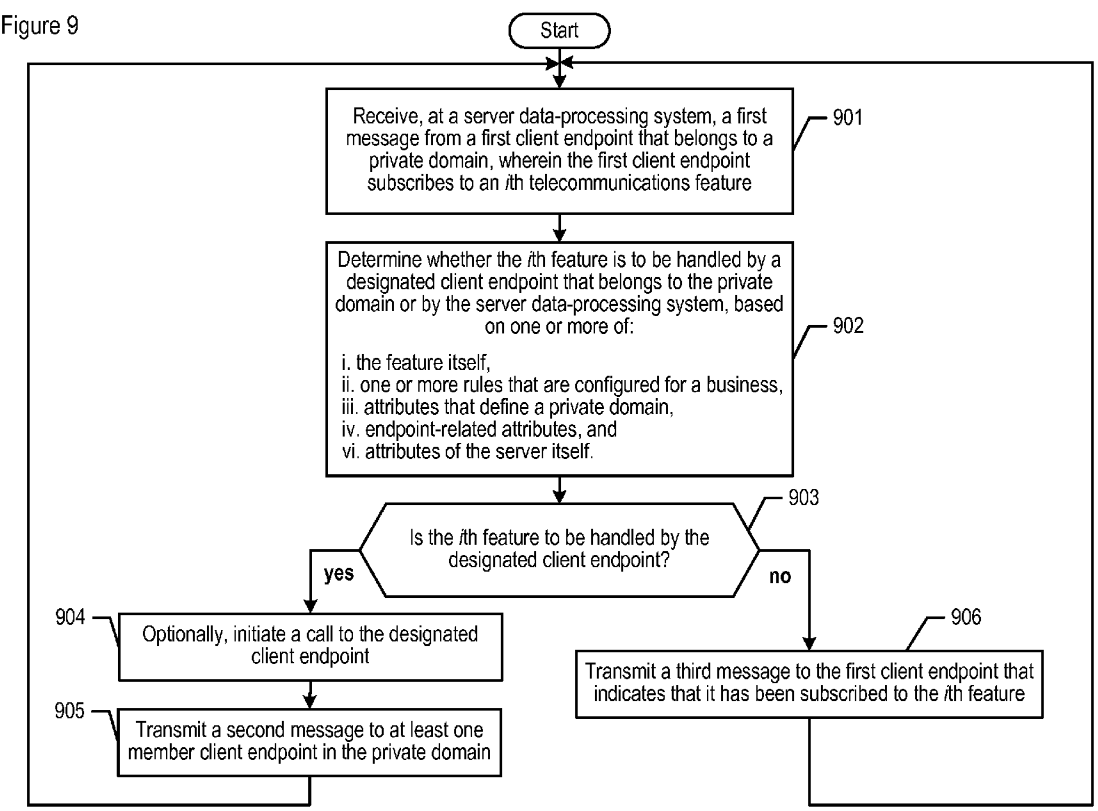
Figure 9
Start
Receive, at a server data-processing system, a first message from a first client endpoint that belongs to a private domain, wherein the first client endpoint subscribes to an ith telecommunications feature
901
Determine whether the ith feature is to be handled by a designated client endpoint that belongs to the private domain or by the server data-processing system, based on one or more of:
i. the feature itself,
ii. one or more rules that are configured for a business,
iii. attributes that define a private domain,
iv. endpoint-related attributes, and
vi. attributes of the server itself.
902
Is the ith feature to be handled by the designated client endpoint?
903
yes
no
904
Optionally, initiate a call to the designated client endpoint
905
Transmit a second message to at least one member client endpoint in the private domain
906
Transmit a third message to the first client endpoint that indicates that it has been subscribed to the ith feature

CENTRALIZED CONTROLLER FOR DISTRIBUTED HANDLING OF TELECOMMUNICATIONS FEATURES

FIELD OF THE INVENTION

The present invention relates to telecommunications in general, and, more particularly, to determining where a telecommunications feature is to be handled and notifying one or more client endpoints of the result.

BACKGROUND OF THE INVENTION

FIG. 1 depicts telecommunications system 100 in the prior art. System 100 comprises telecommunications network 101; client endpoints 102-1 through 102-H, wherein H is a positive integer; and servers 103-1 through 103-L, wherein L is a positive integer. The elements of system 100 are interconnected as shown. System 100 enables calls, via network 101, between endpoints 102-1 through 102-H and servers 103-1 through 103-L. Network 101 comprises one or more of the Internet, the Public Switched Telephone Network (PSTN), a local area network (LAN), and so forth.

Client endpoints 102-1 through 102-H are telecommunications devices such as an Internet-protocol telephone, a notebook computer, a personal digital assistant (PDA), a tablet computer, and so forth. Each endpoint is capable of originating outgoing calls and receiving incoming calls, in well-known fashion. In addition, each endpoint is capable of one or more communication modes that comprise but are not limited to voice, video, data, email, and instant messaging.

Servers 103-1 through 103-L are data-processing systems that handle telecommunications features that can be subscribed to by the endpoints. The servers are capable of handling features such as voice calling, video streaming, data retrieval, email, instant messaging, availability and presence monitoring, and so forth.

Telecommunications system 100 operates in accordance with the Session Initiation Protocol (SIP), a set of standardized communication rules for initiating and maintaining communication for telephony, presence-based systems, instant messaging, and other telecommunications applications. The increasing use of SIP-based systems represents a fundamental shift in telecommunications, in which a user can be addressed as a logical entity that might possess one or more devices, with each device going in and out of service based on the usage patterns of the user.

As new telecommunications features are built onto the SIP infrastructure, issues are emerging that affect performance throughout telecommunications system 100 and, in particular, servers 103-1 through 103-L. One such issue is an increase in network traffic. For example, as features that are related to monitoring the client endpoints are introduced at a centralized server that also handles call processing, the number of SIP-related events that the server must handle also increases, and consequently the server's capacity to process calls becomes severely degraded.

In some techniques in the prior art, the scalability issue that arises in a centralized server architecture is partially mitigated by partitioning the client endpoint users across multiple servers. Doing so, however, often has the effect of spreading out the call processing-related resource utilization, but not necessarily the SIP events-related utilization. Consequently, there are at least three issues with the centralized server architecture in the long run. First, as the user acquires more and more SIP-enabled endpoints that can communicate media or report presence, there will be less of an opportunity for scalability through mere partitioning; this is because the call processing-related resource utilization will amount to a smaller and smaller fraction of the total utilization. Second, as the variety of endpoint types increases and the demand for ease-of-use by the end user increases, the complexity of the centralized server will increase exponentially. And third, as the server complexity increases, so will the effort that will be required for the development of new features.

What is needed is a way to mitigate the server scalability issue, without some of the disadvantages in the prior art.

SUMMARY OF THE INVENTION

The present invention enables an improvement in the scalability of a centralized server by reallocating some, but not all, of the feature functionality of the server to the client endpoints. In accordance with the illustrative embodiment of the present invention, each logical user in the system is represented by a private domain of endpoint entities, from which an endpoint is selected to serve as a super peer to represent the user to the centralized server, as is the case in a hybrid peer-to-peer system. Those endpoint entities can be physical devices; logical instances of the user's capability in shared software systems, applications, and services; or a combination of the two. Furthermore, a designated endpoint is selected, also from the private domain of endpoints, to handle some of the telecommunications features that the server otherwise would have handled. The super-peer endpoint and the designated endpoint can be the same endpoint or different endpoints. Advantageously, each endpoint in the private domain is permitted to have limited direct access to the server, typically for the purposes of registering and subscribing to features, in addition to and in contrast with the indirect access through the super peer. During the subscribing process, the server redirects a subscribing endpoint to the designated endpoint that is handling the feature.

The centralized server of the illustrative embodiment enables the reallocation of one or more telecommunications features to some of the client endpoints, as described in this specification. The server receives a subscribe message from a client endpoint that is attempting to subscribe to a particular telecommunications feature or features. The server then determines whether the feature being subscribed to is to be handled by the server itself or by a designated client endpoint that belongs to the private domain of the subscribing endpoint. This determination is based on one or more considerations that include, but are not limited to, the following:

i. the feature itself;

ii. one or more rules that are configured for a business, such as rules that are based on what defines a private domain;

iii. attributes that define a private domain, such as the physical proximity of endpoints to each other;

iv. the identity of the endpoint that is attempting to subscribe;

v. other attributes of the endpoint, such as one or more capabilities of the endpoint; and vi. attributes of the server itself, such as the current resource utilization of the server.

If the server determines that the telecommunications feature being subscribed to is to be handled by a designated client endpoint in the private domain, the server then transmits a message to at least one of the client endpoints in the private domain (e.g., the subscribing endpoint, the designated client endpoint, the super-peer endpoint, etc.), which message redirects the subscribing endpoint to the designated endpoint. In some embodiments, the server first transmits a message (e.g., as part of a call initialization, etc.) to the designated endpoint that indicates that the endpoint has been designated to handle the subscribed-to feature.

The illustrative embodiment of the present invention is advantageous over some techniques in the prior art, in that it enables a mitigation of the server scalability issue, in terms of reducing the amount of associated messaging from order (n*k*m) to roughly order (n), where n is the number of users in the system, k is the number of endpoints per user, and m is the number of messages per endpoint. Furthermore, since each endpoint is permitted on a limited basis to directly access the centralized server, the pre-existing relationship between a user, the user's endpoints, and the server is still maintained. This is particularly advantageous over, for example, pure peer-to-peer systems in the prior art because it is often important to retain some features at the server, particularly those that require a higher level of reliability than what some endpoints might be able to provide.

The illustrative embodiment of the present invention comprises: receiving, at a data-processing system, a first message from a first client endpoint that is a member of a user domain, wherein the first client endpoint attempts to subscribe to a first telecommunications feature via the first message; determining which one of (i) a designated client endpoint that is a member of the user domain and (ii) the data-processing system is to handle the first telecommunications feature; and when the first telecommunications feature is to be handled by the designated client endpoint, transmitting a second message to at least one member client endpoint in the user domain, wherein the second message is transmitted after receiving the first message; wherein the user domain comprises the client endpoints that are associated with a first user.

BRIEF DESCRIPTION OF THE DRAWINGS

FIG. 9 depicts a flowchart of the salient tasks that are executed by server data-processing system 203-*n*, in accordance with the illustrative embodiment of the present invention.

DETAILED DESCRIPTION

The following terms are defined for use in this Specification, including the appended claims:

The term "call," and its inflected forms, is defined as a communication of user information between two or more telecommunications endpoints. Examples of a call are a voice telephone call (including interactive voice response [IVR] sessions), an emailing, a text-based instant message [IM] session, a video conference, and so forth. In a Session Initiation Protocol (or "SIP") context, a call is a type of session.

The term "private domain," and its inflected forms, is defined as a group of networked telecommunications endpoints (either physical devices or logical instances, or both) that share at least one particular attribute such as being associated with the same user, being in physical proximity with each other, and so forth.

The term "user domain," and its inflected forms, is defined as a private domain in which all of the endpoints in the domain are associated with the same user and which comprises all of the endpoints at which the user is currently registered, regardless of location. For example, the contact address, as is known in the art, of each endpoint in a particular user domain maps to the public address of the particular user.

The term "member endpoint," and its inflected forms, is defined as a telecommunications endpoint that belongs to (i.e., is a member of) a private domain, such as a user domain or a domain based on endpoint proximity.

The term "designated endpoint," and its inflected forms, is defined as a telecommunications endpoint that has been designated to handle (i.e., have the responsibility for providing) a telecommunications feature in a private domain for one or more endpoints in that domain. There can be more than designated endpoint in a private domain.

Figure 1:
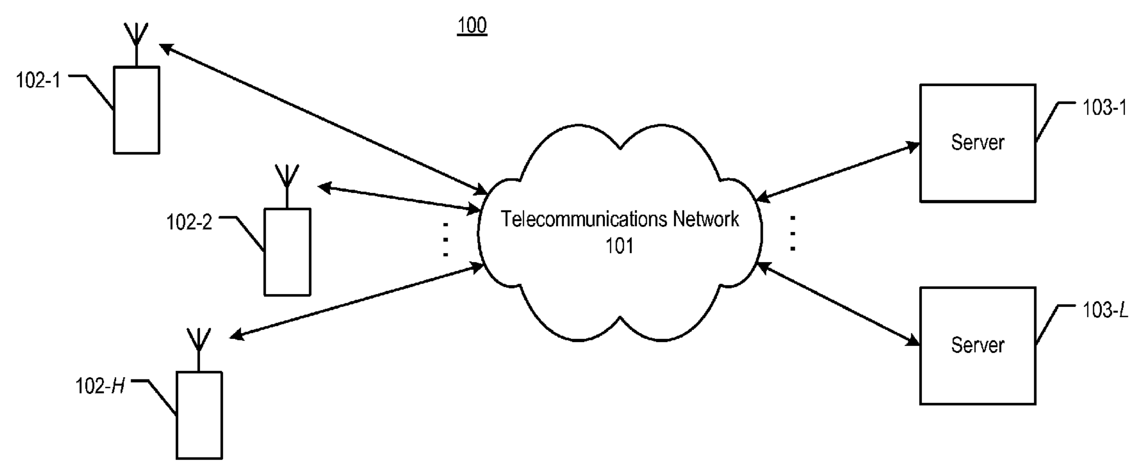
FIG. 1 depicts telecommunications system 100 in the prior art.
Figure 2:
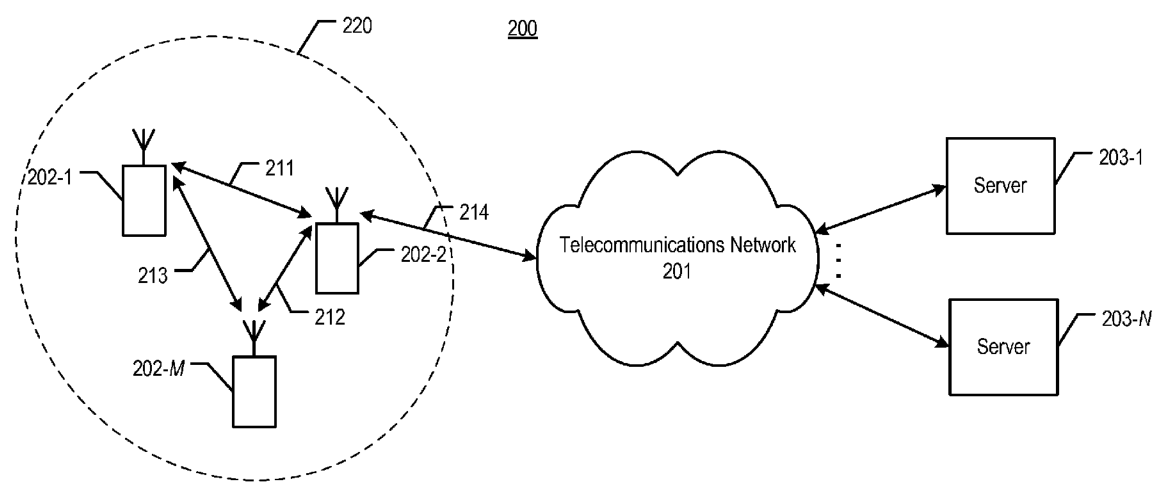
FIG. 2 depicts a first diagram of telecommunications system 200 that comprises private domain 220.

FIG. 2 depicts telecommunications system 200, a hybrid peer-to-peer system, as is known in the art, which comprises telecommunications network 201; client endpoints 202-1 through 202-M, wherein M is a positive integer; and servers 203-1 through 203-N, wherein N is a positive integer. Although M is depicted as being equal to 3, the number of endpoints can be different from that depicted, as those who are skilled in the art will appreciate. The depicted elements in system 200 are interconnected as shown. System 200 is capable of handling calls between endpoints via Session Initiation Protocol-based (SIP-based) signaling, in accordance with the illustrative embodiment. Nevertheless, it will be clear to those who are skilled in the art how to apply the present invention to some alternative embodiments that use other types of call-control signaling, such as H.323, as is known in the art. As depicted, system 200 comprises endpoints 202-1 through 202-M and servers 203-1 through 203-N in the illustrative embodiment; however, it will also be clear to those skilled in the art how to apply the present invention to some alternative embodiments that further comprise legacy endpoints or servers, or both, in which those legacy endpoints and servers do not embody the tasks described below and with respect to FIGS. 8 and 9.

Telecommunications network 201 is a network that comprises one or more of the Internet, the Public Switched Telephone Network (PSTN), a local area network (LAN), and so forth. Network 201 comprises or is connected to one or more transmission-related nodes such as gateways, routers, or switches that are used to direct packets from one or more sources to their correct destinations. Network 201 is capable of handling SIP-based messages in well-known fashion that are transmitted among two or more SIP-capable processing systems.

Each client endpoint 202-*m*, for m=1 through M, is a telecommunications device such as an Internet-protocol telephone, a notebook computer, a personal digital assistant (PDA), a tablet computer, and so forth. The salient components of endpoint 202-*m* are described below and with respect to FIG. 6. Endpoint 202-*m* is capable of originating outgoing calls and receiving incoming calls, in well-known fashion. In addition, endpoint 202-*m* is capable of one or more communication modes that comprise but are not limited to voice, video, data, email, and instant messaging. In accordance with the illustrative embodiment, endpoint 202-*m* is SIP-capable, but as those who are skilled in the art will appreciate, in some alternative embodiments endpoint 202-*m* can operate in accordance with a different type of call-control protocol.

Endpoint 202-*m* is able to provide access to telecommunications features to its user. As a client device, endpoint 202-*m* is able to access one or more servers 203-1 through 203-N for the purpose of providing server-based telecommunications features to its user. Endpoint 202-*m* is also able to communicate with other endpoints for the purpose of subscribing to endpoint-based, telecommunications features; in turn, one or more of endpoints 202-1 through 202-M are able to handle those telecommunications features on behalf of the subscribing endpoints. Moreover, endpoint 202-*m* executes the tasks described below and with respect to FIG. 8 in supporting the distributed feature functionality of the illustrative embodiment.

Each endpoint 202-*m* is identified by a unique contact address, as is known in the art. The contact addresses for endpoints 202-1 through 202-M are associated with a public address of the particular user. The public address, as is known in the art, is an identifier that is used to represent the user publicly. It is an address that might, for example, appear on the user's business card. When calling parties specify the user's public address, it is up to the SIP network to resolve the address down to one or more of several endpoint devices that the user might possess. Each of endpoints 202-1 through 202-M registers its contact address and its association with a particular public address, at which point the endpoint becomes a contact for a particular user.

For example, a user named Carol Q. Jones might have a public address of cjones@company.com and four endpoints that are identified by the following contact addresses:

i. sip:cjones@111.111.111.111:5061;transport=tls;

ii. sip:cqj@111.111.111.222:5061;transport=tls;

iii. sip:19735551212@company.com; and iv. sip: cjones@research.company.com.

In the example, each of Carol's four endpoints is considered to be a contact for the purpose of reaching her. When Carol is called by another party, the public address that is used to specify the destination is cjones@company.com. System 200 routes the incoming call that was placed to cjones@company.com to one or more of endpoints 202-1 through 202-M.

Endpoints 202-1 through 202-M are all depicted as wireless devices in the illustrative embodiment. As those who are skilled in the art will appreciate, some alternative embodiments of the present invention can comprise endpoints that are all wired or can comprise a mix of wireless and wired endpoints. Furthermore, as those who are skilled in the art will appreciate, the wireless communication protocol can be cellular-based, WiFi-based, Bluetooth-based, or based on yet a different set of rules.

Endpoints 202-1 through 202-M are all depicted also as physical devices in the illustrative embodiment. As those who are skilled in the art will appreciate, however, some alternative embodiments of the present invention can comprise endpoint entities that are instead logical instances of a user's capability in shared software systems, applications, and services. A logical instance can be resident at one device, such as a shared computing system, even though that logical instance was created as the result of the user logging into telecommunications system 200 by using a different device. In other words, the Session Initiation Protocol enables the user to log in via a first device and be represented by an addressable endpoint entity virtually anywhere throughout system 200, such as in a first application (e.g., conferencing, etc.) that is not necessarily resident at the first device. The same user could then log into system 200 via a second device—with or without having logged out of the first application—and be represented by an addressable endpoint entity in another place, such as in a different application (e.g., one with screen pops and an instant messaging interface, etc.).

In the illustrative embodiment, endpoints 202-1 through 202-M are associated with to a specific human user. As those who are skilled in the art will appreciate, however, endpoints 202-1 through 202-M might be associated with a user that is itself a telecommunications device, such as an automated call distributor (ACD). In this case, incoming calls have as their destination address the address of the ACD system, where the individual contact addresses, as are known in the art, correspond to the various endpoints in the ACD system.

In any event, it will be clear to those skilled in the art, after reading this specification, how to make and use endpoints 202-1 through 202-M.

Server 203-*n*, for n=1 through N, is a data-processing system that handles one or more server-based, telecommunications features that can be subscribed to by the endpoints, and operates in accordance with the Session Initiation Protocol. The salient components of server 203-*n* are described below and with respect to FIG. 7. The server-based features that server 203-*n* handles can include but are not limited to SIP event packages (e.g., as a SIP event server, etc.), call processing (e.g., as a SIP proxy, etc.), voice calling, video streaming, email, voice mail, instant messaging, web access, other data retrieval, and presence-based services (e.g., availability and presence monitoring, etc.). Note that some of the features that server 203-*n* is able to handle are also referred to as "services." Each server 203-*n* is able to handle its own set of server-based telecommunications features. Moreover, server 203-*n* executes the tasks described below and with respect to FIG. 9 in supporting the distributed feature functionality of the illustrative embodiment.

Although server data-processing system 203-*n* executes the tasks of the illustrative embodiment, in some alternative embodiments another data-processing system can be used to execute those tasks, as those who are skilled in the art will appreciate. Furthermore, in accordance with the illustrative embodiment, server 203-*n* is SIP-capable, but as those who are skilled in the art will appreciate, in some alternative embodiments server 203-*n* can operate in accordance with a different type of call-control protocol. In any event, it will be clear to those skilled in the art, after reading this specification, how to make and use server 203-*n*.

Private domain 220 comprises client endpoints 203-1 through 203-N, each of which is said to belong to domain 220. In accordance with the illustrative embodiment, private domain 220 is a user domain. As those who are skilled in the art will appreciate, however, in some alternative embodiments private domain 220 can be defined based on a different attribute than endpoints that are associated with the same user. For example, domain 220 can be defined as comprising those endpoints that are in close physical proximity to each other or are in direct communication range of each other.

Within domain 220, client endpoints 202-1 through 202-M are able to function as either equal peers or super peers. An "equal peer" is able to communicate peer-to-peer with other endpoints in the same private domain, in well-known fashion. A "super peer," in addition to being able to communicate peer-to-peer with the other endpoints, communicates with servers 203-1 through 203-N, as an agent of itself and its peers. As depicted in FIG. 2, for example, endpoint 202-2 is the super peer, while the other endpoints depicted are not; therefore, endpoints other than 202-2 communicate with servers 203-1 through 203-N through the super-peer endpoint and communication path 214. Regardless of peer status, each of endpoints 202-1 through 202-M runs an onboard software agent, wherein the agent is responsible for peer-to-peer routing and communication, as well as possibly other telecommunications features to be described later.

Communication paths 211, 212, and 213 enable the peer-to-peer communication exchanges between endpoints 202-1 through 202-M. As depicted in FIG. 2, in some situations the transmission between two endpoints occurs directly. For example, endpoint 202-1 might be within direct communication range of endpoint 202-2 and, as a result, transmits signals via path 211 (i.e., a wireless medium) directly to endpoint 202-2 in well-known fashion and without assistance from any other endpoint.

In some situations, the transmission between two endpoints occurs indirectly through one or more networks, such as a wireline network. For example, endpoints 202-1 through 202-M might communicate with each other through one or more intermediate systems, such as base stations and switching centers. This can be either because the endpoints are scattered across widely-separated geographic regions that are out of direct communication range with each other or because the endpoints receive service via different service providers (e.g., Boingo for WiFi, Verizon for cellular, etc.) and cannot communicate directly with each other.

Figure 3:
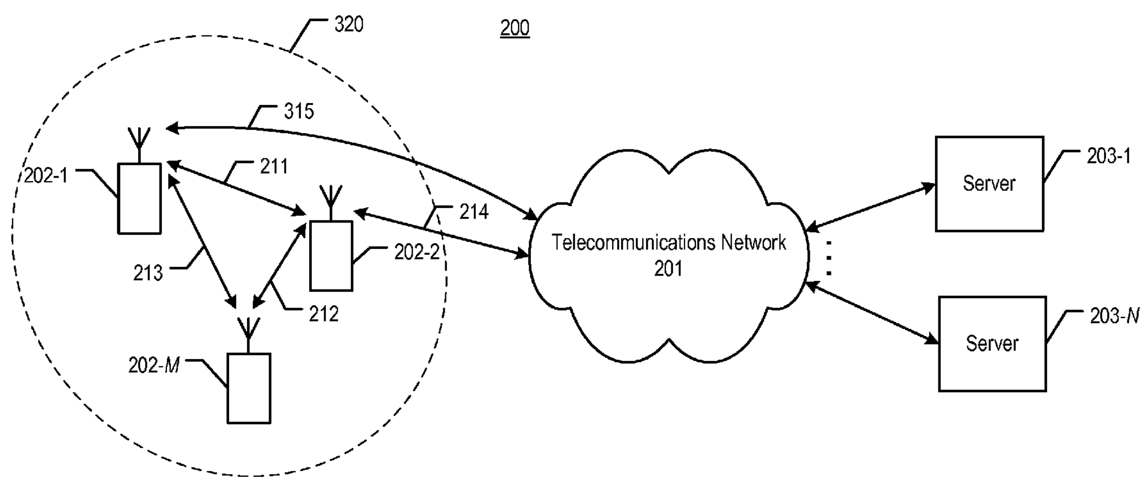
FIG. 3 depicts a second diagram of telecommunications system 200 that comprises private domain 320, in accordance with the illustrative embodiment of the present invention.

As depicted in FIG. 3, the relationship between endpoints and the rest of telecommunications system 200 can be different than the relationship described with respect to FIG. 2. FIG. 3 depicts private domain 320, which is similar to private domain 220, except that one or more of the peer endpoints other than super-peer endpoint 202-2 are both able and allowed to access telecommunications network 201 directly (i.e., not requiring an intermediary super-peer endpoint). As depicted in FIG. 3, for example, client endpoint 202-2 is the super peer, yet client endpoint 202-1 is allowed to access network 201 directly via communication path 315, instead of having to go through endpoint 202-2.

Figure 4:
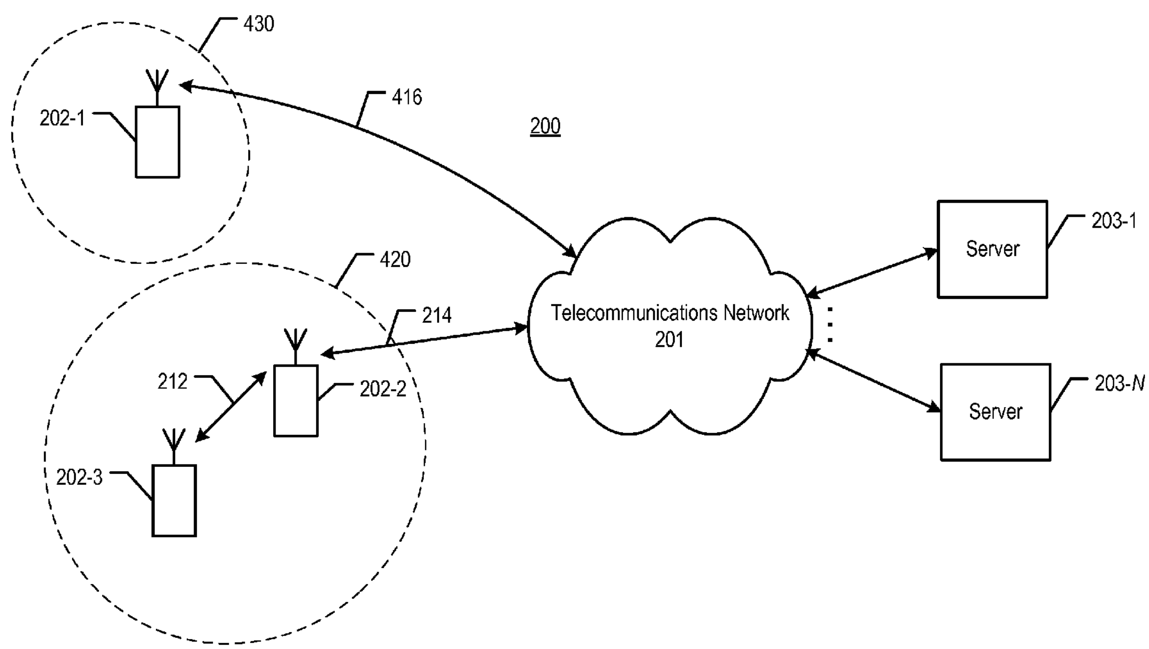
FIG. 4 depicts a third diagram of telecommunications system 200 that comprises private domains 420 and 430, in accordance with the illustrative embodiment of the present invention.

As depicted in FIG. 4, each private domain can be defined by an attribute other than comprising all of the endpoints that belong to a particular user. For example, FIG. 4 depicts private domain 420, which is defined as comprising all of the endpoints that are in close physical proximity in a first area (i.e., endpoints 202-2 and 202-3), and private domain 430, which is defined as comprising all of the endpoints that are in close physical proximity in a second area (i.e., endpoints 202-1 only). Client endpoint 202-2 is the super-peer endpoint in private domain 420. Client endpoint 202-1 is the super-peer endpoint in private domain 430, as well as the only endpoint in domain 430 until another endpoint comes along.

Figure 5:
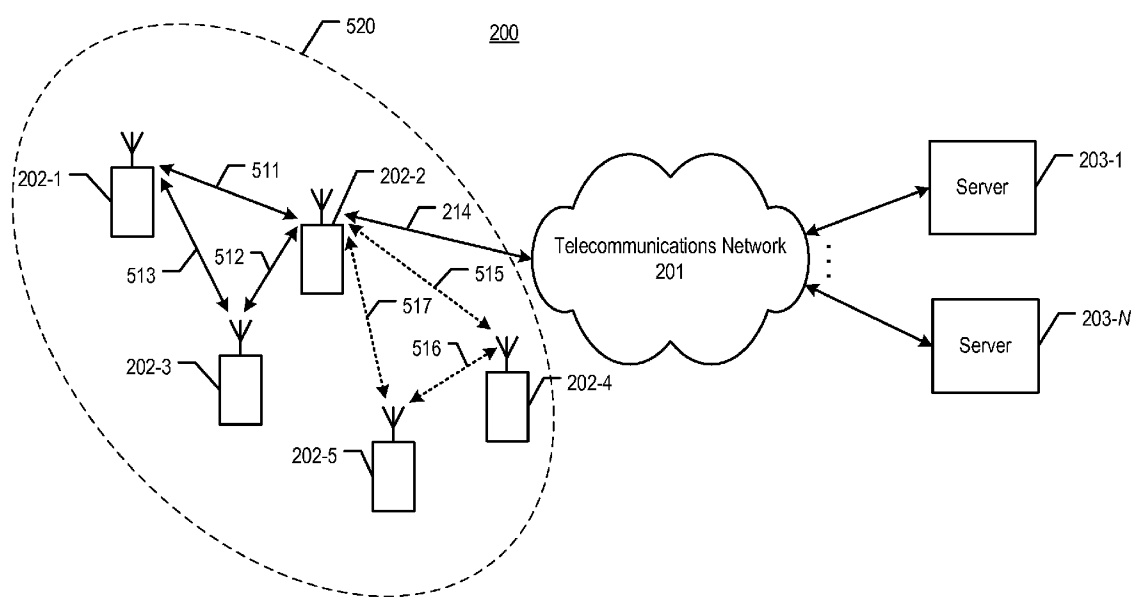
FIG. 5 depicts a fourth diagram of telecommunications system 200 that comprises private domain 520, in accordance with the illustrative embodiment of the present invention.

FIG. 5 depicts a plurality of endpoints within private domain 520. In this example, all of the endpoints depicted are associated with a particular user. The plurality of endpoints comprises a super-peer endpoint 202-2, as well as other client endpoints that are members of domain 520. As a super-peer, endpoint 202-2 communicates with one or more servers 203-*n* as an agent of one or more other endpoints in the plurality. In accordance with the illustrative embodiment, at least some of the endpoints, such as endpoints 202-1 and 202-4, are capable of subscribing to telecommunications features via one or more servers 203-*n*. Moreover, at least some of the endpoints, such as endpoints 202-3 and 202-5, are capable of handling one or more telecommunications features, though not necessarily those features to which some endpoints attempt to subscribe via the servers. In some embodiments, some of the client endpoints are allowed to access network 201 without having to go through super-peer endpoint 202-2.

At least some of the endpoints in domain 520—as well as in some of the other depicted domains, for that matter—are capable of inquiring about one or more capabilities that are present among the endpoints. For example, endpoint 202-1 might query the other endpoints about their abilities to communicate at or above a predetermined quality-of-service level (e.g., bandwidth, error rate, latency, etc.). As a result of the inquiry, endpoint 202-1 might find that endpoints 202-1, 202-2, and 202-3 are able to support voice services (i.e., by being able to communicate above a specified quality-of-service level), while endpoints 202-4 and 202-5 are not able to support voice services but are still able to support instant messaging services, along with endpoint 202-2. As a result, endpoints 202-1, 202-2, and 202-3 will be able to transfer voice packets directly with each other, or at least without involving network 201, via paths 511, 512, and 513; at the same time, endpoints 202-2, 202-4, and 202-5 will be able to transfer instant messaging packets directly with each other via paths 515, 516, and 517.

In addition to communication-related capability, other types of capabilities that might be present at one or more endpoints in domain 520 can be related to storage capability, processing capability, and user presentation (e.g., display, etc.) capability, as well as the ability to provide one or more specified telecommunications features. For example, one such capability might be an endpoint's capability to display the HTML-based content of messages. In fact, a particular telecommunications feature might comprise the ability to select an endpoint to present media content to a user. As those who are skilled in the art will appreciate, each given endpoint in the plurality of endpoints associated with domain 520 can inquire about, report on, or handle other capabilities than those already mentioned.

Figure 6:
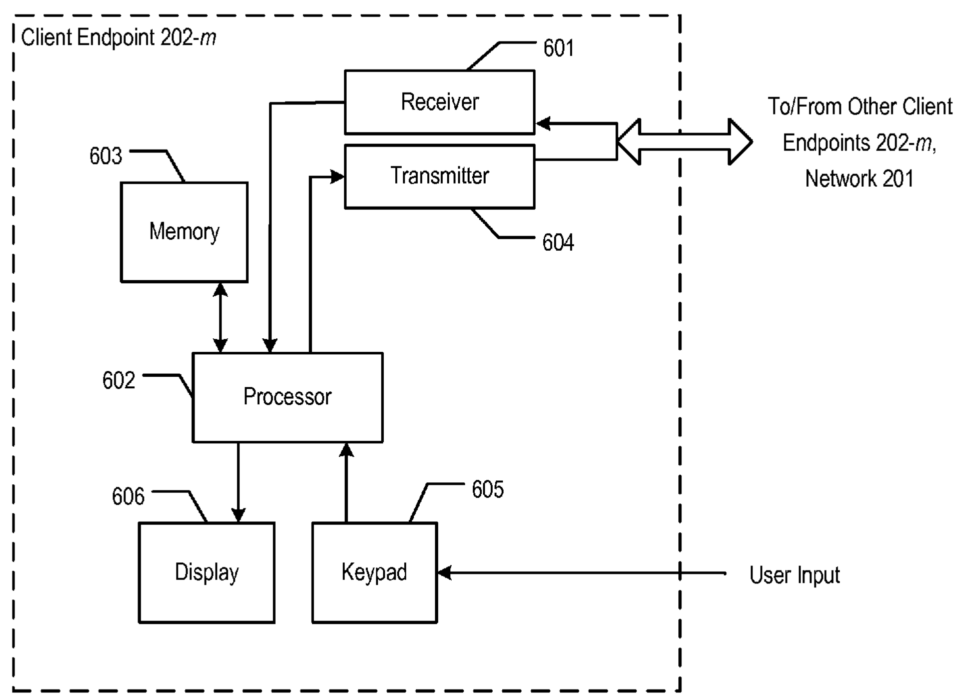
FIG. 6 depicts a block diagram of the salient components of client endpoint 202-*m* in system 200.

FIG. 6 depicts the salient components of client endpoint 202-*m* in accordance with the illustrative embodiment of the present invention. Endpoint 202-*m* comprises receiver 601, processor 602, memory 603, and transmitter 604, interconnected as shown.

Receiver 601 is part of a network interface that is capable of receiving signals from other client endpoints in the same private domain, as well as signals from one or more of server data-processing systems 203-1 through 203-N via network 201, and forwards the information encoded in the signals to processor 602, in well-known fashion. It will be clear to those skilled in the art, after reading this specification, how to make and use receiver 601.

Processor 602 is a general-purpose processor that is capable of receiving information from receiver 601, executing instructions stored in memory 603, reading data from and writing data into memory 603, executing the tasks described below and with respect to FIG. 8, and transmitting information to transmitter 604. In some alternative embodiments of the present invention, processor 602 might be a special-purpose processor. In either case, it will be clear to those skilled in the art, after reading this specification, how to make and use processor 602.

Memory 603 stores the instructions and data used by processor 602. Memory 603 might be any combination of dynamic random-access memory (RAM), flash memory, disk drive memory, and so forth. It will be clear to those skilled in the art, after reading this specification, how to make and use memory 603.

Transmitter 604 is part of a network interface that receives information from processor 602 and is capable of transmitting signals that encode this information to other client endpoints in the same private domain, as well as signals to one or more of server data-processing systems 203-1 through 203-N via network 201, in well-known fashion. It will be clear to those skilled in the art, after reading this specification, how to make and use transmitter 604.

Keypad 605 accepts input signals from the user, and display 606 presents displayable signals to the user, both in well-known fashion.

Figure 7:
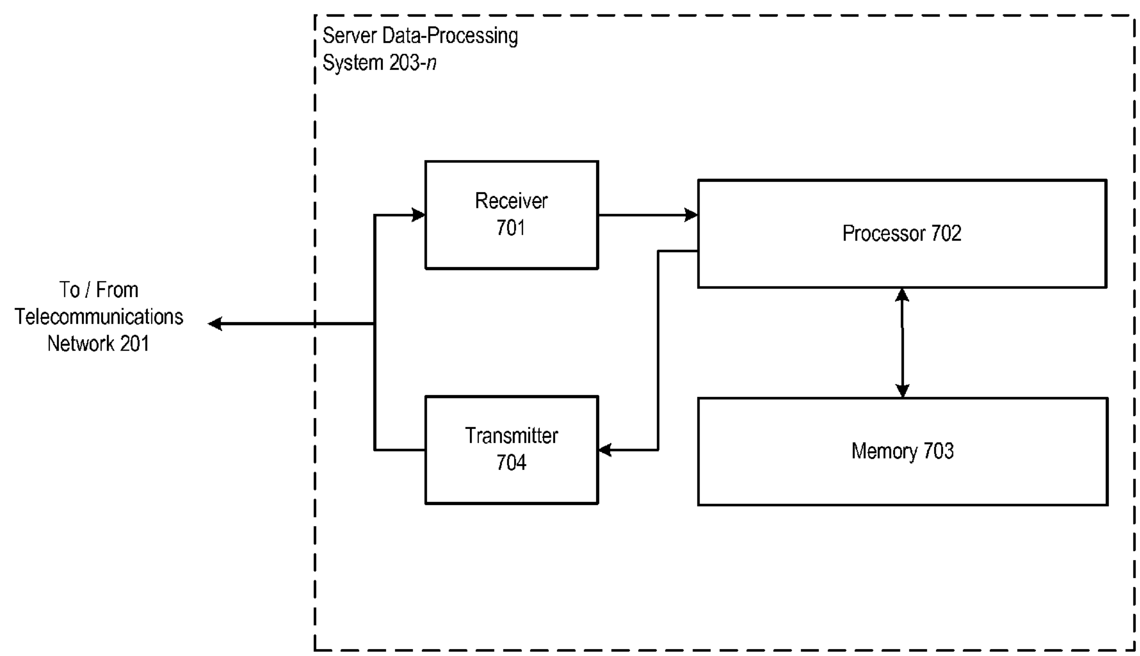
FIG. 7 depicts a block diagram of the salient components of server data-processing system 203-*n* in system 200.

FIG. 7 depicts the salient components of server data-processing system 203-*n* in accordance with the illustrative embodiment of the present invention. Server 203-*n* comprises receiver 701, processor 702, memory 703, and transmitter 704, interconnected as shown.

Receiver 701 is part of a network interface that receives signals from client endpoints (e.g., endpoint 202-*m*, etc.) via network 201 and forwards the information encoded in the signals to processor 702, in well-known fashion. It will be clear to those skilled in the art, after reading this specification, how to make and use receiver 701.

Processor 702 is a general-purpose processor that is capable of receiving information from receiver 701, executing instructions stored in memory 703, reading data from and writing data into memory 703, executing the tasks described below and with respect to FIG. 9, and transmitting information to transmitter 704. In some alternative embodiments of the present invention, processor 702 might be a special-purpose processor. In either case, it will be clear to those skilled in the art, after reading this specification, how to make and use processor 702.

Memory 703 stores the instructions and data used by processor 702. Memory 703 might be any combination of dynamic random-access memory (RAM), flash memory, disk drive memory, and so forth. It will be clear to those skilled in the art, after reading this specification, how to make and use memory 703.

Transmitter 704 is part of a network interface that receives information from processor 702 and transmits signals that encode this information to client endpoints (e.g., endpoint 202-*m*, etc.) via network 201, in well-known fashion. It will be clear to those skilled in the art, after reading this specification, how to make and use transmitter 704.

Figure 8:
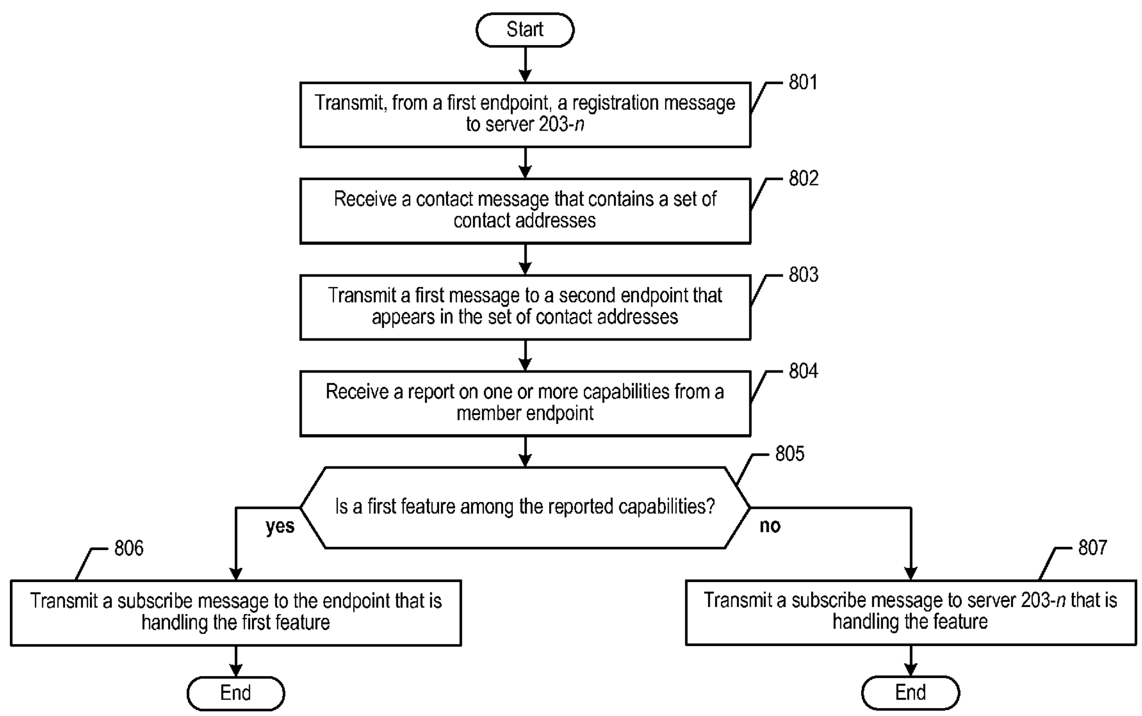
FIG. 8 depicts a flowchart of the salient tasks that are executed by client endpoint 202-*m*, in accordance with the illustrative embodiment of the present invention.

FIGS. 8 and 9 depict flowcharts of salient tasks that involve informing a client endpoint that is subscribing to a telecommunications feature about where the feature is being handled (e.g., at another client endpoint 202-*m*, at server 203-*n*, etc.). In particular, the tasks in FIG. 8 constitute a first technique, in which the subscribing endpoint first queries other endpoints in the same private domain about one or more capabilities, such as the ability to provide a feature, and then receives a report on where those capabilities can be found. The tasks in FIG. 9 constitute a second technique in which server 203-*n* informs the subscribing endpoint about where the feature can be found. As those who are skilled in the art will appreciate, some of the tasks that appear in FIG. 8 or 9 can be performed in parallel or in a different order than that depicted. Moreover, those who are skilled in the art will further appreciate that in some embodiments of the present invention, only the tasks in FIG. 8 are performed, while in some other embodiments only the tasks in FIG. 9 are performed, while in still some other embodiments some or all of the tasks in both FIGS. 8 and 9 are performed.

FIG. 8 depicts a flowchart of the salient tasks that are executed by client endpoint 202-*m*, in accordance with the illustrative embodiment of the present invention. The depicted tasks involve informing a first client endpoint about where one or more capabilities are being handled, including features that the first client endpoint might subscribe to. The tasks are associated with communication among one or more of client endpoints 202-1 through 202-M and, optionally, with server 203-*n*. For pedagogical purposes, the tasks associated with FIG. 8 are described below as being executed by endpoint 202-1.

At task 801, endpoint 202-1 transmits a registration message to a registrar server, which for pedagogical purposes is server 203-2. Referring to FIG. 5, endpoint 202-1 transmits the message via endpoint 202-2, which handles at least some of the communication with server 203-2 as an agent of endpoint 202-1. In some alternative embodiments, endpoint 202-1 is able to transmit at least the registration message to server 203-2 without the assistance of any other endpoint.

At task 802, in response to having sent the registration message, endpoint 202-1 receives a plurality of contact addresses of endpoints (e.g., in a list, etc.) that are associated with the user of private domain 520. The plurality of contact addresses essentially identifies member endpoints of domain 520 to endpoint 202-1.

At task 803, endpoint 202-1 transmits a first message to a second endpoint (e.g., endpoint 202-2, endpoint 202-3, etc.) based on that second endpoint having been identified by a first contact address in the plurality of contact addresses. The first message inquires about one or more capabilities that might be present in the plurality of endpoints. Capabilities that might be present at one or more endpoints include, but are not limited to, the following:

i. the ability to communicate in a particular manner (e.g., at a specific level of service, via a specific protocol, in a specific format, etc.);

ii. the ability to process or store information in a particular manner;

iii. the ability to present information to an endpoint user in a particular manner; and iv. the ability to provide a particular telecommunications feature to another endpoint or endpoints.

The inquiry might refer to specific capabilities, or the inquiry might be a general request to report back on whatever capabilities are supported. In some alternative embodiments, endpoint 202-1 also transmits a capabilities inquiry message to one or more additional endpoints identified by the plurality of contact addresses.

At task 804, endpoint 202-1 receives a second message from one of the members of the plurality of endpoints, wherein the second message comprises a report on one or more capabilities queried about at task 803. In some embodiments, the member endpoint that reports the capabilities might be the same as the endpoint to which the inquiry was sent, while in some other embodiments the member endpoint that reports the capabilities might be different than the queried endpoint. Furthermore, report messages might be received from more than one endpoint. For example, endpoint 202-3 might indicate that it has voice-handling capabilities, and endpoint 202-5 might indicate that it has instant messaging capabilities. As another example, endpoint 202-2 (i.e., the super peer) might indicate that endpoint 202-3 has voice-handling capabilities and endpoint 202-5 has instant messaging capabilities. Based on the available capabilities, the querying endpoint can determine the best endpoint or subset of endpoints to handle a particular feature on behalf of the querying endpoint.

In accordance with the illustrative embodiment, each queried endpoint determines which capabilities to advertise to endpoint 202-1 as being available. In some alternative embodiments, endpoint 202-1 instead determines which capabilities it can use out of the reported capabilities, while in some other alternative embodiment yet another endpoint (e.g., super-peer endpoint 202-2, etc.) determines which capabilities endpoint 202-1 can use. This determination is based on one or more considerations that include, but are not limited to, the following:

i. attributes in the private domain, such as the physical proximity of endpoints to each other or the quality-of-service levels that are available for communication;

ii. the identity of the querying endpoint;

iii. other attributes of the querying endpoint, such as one or more capabilities of the endpoint;

iv. attributes of other endpoints;

v. the relationship of two or more endpoints; and vi. the telecommunications feature that will be subscribed to by the querying endpoint.

At task 805, endpoint 202-1 checks whether a particular telecommunications feature is available at an endpoint in domain 520 or at a server, based on one or more capabilities reports that endpoint 202-1 received from other endpoints at task 804. If the feature of interest is to be handled by an endpoint, task execution proceeds to task 806. Otherwise, if the feature of interest is to be handled by a server, task execution proceeds to task 807.

At task 806, endpoint 202-1 transmits a subscribe message to the client endpoint that is handling the feature being subscribed to (i.e., a designated endpoint), in which the message indicates the feature. In some other embodiments, endpoint 202-1 transmits the message to a different member client endpoint in domain 520 than the one that handles the feature, which then processes the subscribe message. Task execution then ends.

At task 807, endpoint 202-1 transmits a subscribe message to server 203-*n*, in which the message indicates the feature that is being subscribed to. The subscribe process then continues in well-known fashion. Task execution then ends.

FIG. 9 depicts a flowchart of the salient tasks that are executed by server data-processing system 203-*n*, in accordance with the illustrative embodiment of the present invention. The depicted tasks involve server 203-*n* informing a first client endpoint about where a particular feature is being handled that the first client endpoint is subscribing to. The tasks are associated with communication between one or more client endpoints 202-*m* and server 203-*n*. For pedagogical purposes, the tasks associated with FIG. 9 are described below as being executed by server 203-1, which receives a message from endpoint 202-1.

At task 901, server 203-1 receives a subscribe message from client endpoint 202-1 that is attempting to subscribe to a particular telecommunications feature. The subscribe message indicates the feature or features to which endpoint 202-1 is attempting to subscribe. In some alternative embodiments, server 203-1 receives a subscribe message instead from a different member client endpoint of endpoint 202-1's private domain, which message indicates that endpoint 202-1 is attempting to subscribe to a specified feature or features. This might be the case when, for example, a super-peer endpoint is handling the subscribe-related communications between the private domain and server 203-1.

At task 902, server 203-1 then determines whether the feature being subscribed to is to be handled by the server itself (or another server such as server 203-2) or by a designated client endpoint that belongs to the same private domain as endpoint 202-1. This determination is based on one or more considerations that include, but are not limited to, the following:

vii. the feature itself;

viii. one or more rules that are configured for a business, such as rules that are based on what defines a private domain;

ix. attributes that define a private domain, such as the physical proximity of endpoints to each other;

x. the identity of the endpoint that is attempting to subscribe;

xi. other attributes of the endpoint, such as one or more capabilities of the endpoint; and xii. attributes of the server itself, such as the current resource utilization of the server.

For example, some features are to be always be handled by the server, while other features by an endpoint in the private domain. As a second example, if the determination is based on a rule that involves the bandwidth allocation of a communication channel, a subscribing endpoint that can efficiently communicate with other endpoints in the domain can be redirected to another endpoint in the domain for the feature, while a subscribing endpoint that cannot efficiently communicate with the other endpoints can be directed to the server. As a third example, if the subscribing endpoint is incapable of accessing the feature at another endpoint, the subscribing endpoint can be directed to the server. And as a fourth example, the server might choose to redirect subscribing endpoints to their own private domain only when the current resource utilization at the server rises above a predetermined level.

A variety of telecommunications features can be handled by a designated client endpoint as an agent of the other endpoints in a private domain, instead of being handled by the server. One example of such a feature is a SIP event package, as is known in the art, such as conferencing. Another example of such a feature is the monitoring of device presence, which in a centralized server architecture can result in too much message traffic being offered to the server. Device presence is the low-level state of an individual client device, such as whether the device is on or off. In accordance with the illustrative embodiment, the designated client endpoint can track each device's presence and then aggregate the presence information to present an overall indication of user availability to server 203-1. As yet another example of a reallocated feature, the designated endpoint can handle media such as voice messaging, instant messaging, and so forth. A more specific example of media handling is call recording, in which a user wants to record a new call. Instead of using mixing resources on the centralized server, one or more endpoints in the private domain bridge on and share the responsibilities for recording and storage of the media. As those who are skilled in the art will appreciate, other telecommunications features than those mentioned in the examples can be handled by a designated client endpoint instead of being handled by the server.

The designated client endpoint, which for pedagogical purposes is endpoint 202-2, can be designated in any of a variety of ways as the endpoint to handle the telecommunications feature being subscribed to. The endpoints in the private domain can elect endpoint 202-2 or server 203-1 can select endpoint 202-2 to handle a particular feature. Furthermore, the super-peer endpoint in the illustrative embodiment is also the designated endpoint that handles a feature for its domain; however, as those who are skilled in the art will appreciate in some alternative embodiments, a non-super peer endpoint can handle a feature, or at least a feature that does not require communicating with the servers. And finally, where there are multiple features that are reallocated to the private domain, a first designated endpoint can handle a first feature, a second designated endpoint can handle a second feature, and so forth.

At task 903, server 203-1 checks whether the telecommunications feature being subscribed to is to be handled by a designated client endpoint. If the feature is to be handled by a designated client endpoint, then task execution proceeds to task 904. If not, task execution proceeds to task 906.

At task 904, server 203-1 optionally initiates a call to the designated client endpoint (i.e., endpoint 202-2), instructing the designated endpoint to assume the handling of the telecommunications feature being subscribed to. This occurs when the designated client endpoint is not already in a state in which it is ready to handle the feature.

At task 905, server 203-1 transmits a redirecting message to endpoint 202-1 that indicates that the feature being subscribed to is being handled by an endpoint in endpoint 202-1's private domain. In the illustrative embodiment, the message indicates the particular endpoint that is handling the feature (i.e., endpoint 202-2). In some alternative embodiments, the message merely indicates that the feature is being handled in the private domain—in which case, it is up to endpoint 202-1 to determine the particular endpoint that is handling the feature.

Although in the illustrative embodiment server 203-1 transmits the message to the subscribing endpoint, in some alternative embodiments server 203-1 transmits the message to a different endpoint or endpoints in the private domain (e.g., designated endpoint 202-2, etc.). In this case, it is up to the endpoint that receives the message to inform the subscribing endpoint, which might be indicated in the message or which might need to be determined by the endpoint that receives the message.

After server 203-1 executes task 905, task execution proceeds back to task 901.

At task 906, server 203-1 transmits a response to endpoint 202-1 that the endpoint has been subscribed to the feature, which is being handled by the server itself. Task execution then proceeds back to task 901.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:

receiving, at a data-processing system, a first message from a first client endpoint that is a member of a user domain, wherein said first client endpoint attempts to subscribe to a first telecommunications feature via said first message;

determining which one of (i) a designated client endpoint that is a member of said user domain and (ii) said data-processing system is to handle said first telecommunications feature; and when said first telecommunications feature is to be handled by said designated client endpoint, transmitting a second message to at least one member client endpoint in said user domain, wherein said second message is transmitted after receiving said first message;

wherein all of the client endpoints in said user domain are associated with a first user.

2. The method of claim 1 wherein said first client endpoint is one of said at least one member client endpoint.

3. The method of claim 1 wherein said designated client endpoint is one of said at least one member client endpoint, and wherein said second message indicates that an endpoint in said user domain other than said designated client endpoint is subscribing to said first telecommunications feature.

4. The method of claim 3 further comprising initiating a session to said designated client endpoint that instructs said designated client endpoint to handle said first telecommunications feature.

5. The method of claim 3 wherein said second message indicates that said first client endpoint specifically is subscribing to said first telecommunications feature.

6. The method of claim 3 wherein said first telecommunications feature is related to the monitoring of device presence.

7. The method of claim 1 further comprising:

receiving, at said data-processing system, a third message from a second client endpoint that is also a member of said user domain, wherein said second client endpoint attempts to subscribe to a second telecommunications feature via said third message;

determining which one of (i) said designated client endpoint that is a member of said user domain and (ii) said data-processing system is to handle said second telecommunications feature; and when said second telecommunications feature is to be handled by said data-processing system, transmitting a fourth message to said first client endpoint that indicates that said first client endpoint has been subscribed to said first telecommunications feature.

8. The method of claim 1 wherein the determination of where said first telecommunications feature is to be handled is based on a first capability of said first client endpoint.

9. A method comprising:

receiving, at a data-processing system, a first message from a first client endpoint that is a member of a private domain that is defined by a first attribute, wherein said first client endpoint attempts to subscribe to a first telecommunications feature via said first message;

determining, based on at least one rule that is related to said first attribute, which one of (i) a designated client endpoint that is a member of said private domain and (ii) said data-processing system is to handle said first telecommunications feature; and when said first telecommunications feature is to be handled by said designated client endpoint, transmitting a second message to at least one member client endpoint in said private domain, wherein said second message is transmitted after receiving said first message.

10. The method of claim 9 wherein said first attribute is physical proximity of multiple client endpoints to each other.

11. The method of claim 10 wherein said at least one rule comprises a rule that is related to bandwidth allocation within a communication channel.

12. The method of claim 10 wherein said at least one rule comprises a rule that is related to the location of said first client endpoint.

13. The method of claim 9 wherein said first client endpoint is one of said at least one member client endpoint.

14. The method of claim 9 wherein said designated client endpoint is one of said at least one member client endpoint, and wherein said second message indicates that an endpoint in said private domain other than said designated client endpoint is subscribing to said first telecommunications feature.

15. The method of claim 14 further comprising initiating a session to said designated client endpoint that instructs said designated client endpoint to handle said first telecommunications feature.

16. The method of claim 14 wherein said second message indicates that said first client endpoint specifically is subscribing to said first telecommunications feature.

17. The method of claim 9 further comprising:

receiving, at said data-processing system, a third message from a second client endpoint that is also a member of said private domain, wherein said second client endpoint attempts to subscribe to a second telecommunications feature via said third message;

determining, based on at least one rule that is related to said first attribute, which one of (i) said designated client endpoint that is a member of said private domain and (ii) said data-processing system is to handle said second telecommunications feature; and when said second telecommunications feature is to be handled by said data-processing system, transmitting a fourth message to said first client endpoint that indicates that said first client endpoint has been subscribed to said first telecommunications feature.

18. The method of claim 9 wherein the determination of where said first telecommunications feature is to be handled is based on a first capability of said first client endpoint.

19. A method comprising:

receiving, at a data-processing system, a first message from a first client endpoint that is a member of a private domain, wherein said first client endpoint attempts to subscribe to a first telecommunications feature via said first message;

determining which one of (i) a designated client endpoint that is a member of said private domain and (ii) said data-processing system is to handle said first telecommunications feature; and when said first telecommunications feature is to be handled by said designated client endpoint, initiating a call to said designated client endpoint that instructs said designated client endpoint to handle said first telecommunications feature.

20. The method of claim 19 wherein when said first telecommunications feature is to be handled by said designated client endpoint, transmitting a second message to at least one member client endpoint in said private domain, wherein said second message is transmitted after receiving said first message.

21. The method of claim 20 wherein all of the client endpoints in said private domain are associated with a first user.

22. The method of claim 20 wherein said first client endpoint is one of said at least one member client endpoint.

23. The method of claim 20 further comprising:

receiving, at said data-processing system, a third message from a second client endpoint that is also a member of said private domain, wherein said second client endpoint attempts to subscribe to a second telecommunications feature via said third message;

determining, based on at least one rule that is related to said first attribute, which one of (i) said designated client endpoint that is a member of said private domain and (ii) said data-processing system is to handle said second telecommunications feature; and when said second telecommunications feature is to be handled by said data-processing system, transmitting a fourth message to said first client endpoint that indicates that said first client endpoint has been subscribed to said first telecommunications feature.

24. The method of claim 19 wherein the determination of where said first telecommunications feature is to be handled is also based on at least one rule that is related to an attribute of said private domain.

* * * * *

UNITED STATES PATENT AND TRADEMARK OFFICE

CERTIFICATE OF CORRECTION

PATENT NO. : 7,656,836 B2
APPLICATION NO. : 11/539162
DATED : February 2, 2010
INVENTOR(S) : Baker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 790 days.

Signed and Sealed this

Thirtieth Day of November, 2010

David J. Kappos

*Director of the United States Patent and Trademark Office*